UNITED STATES PATENT OFFICE 2,473,584

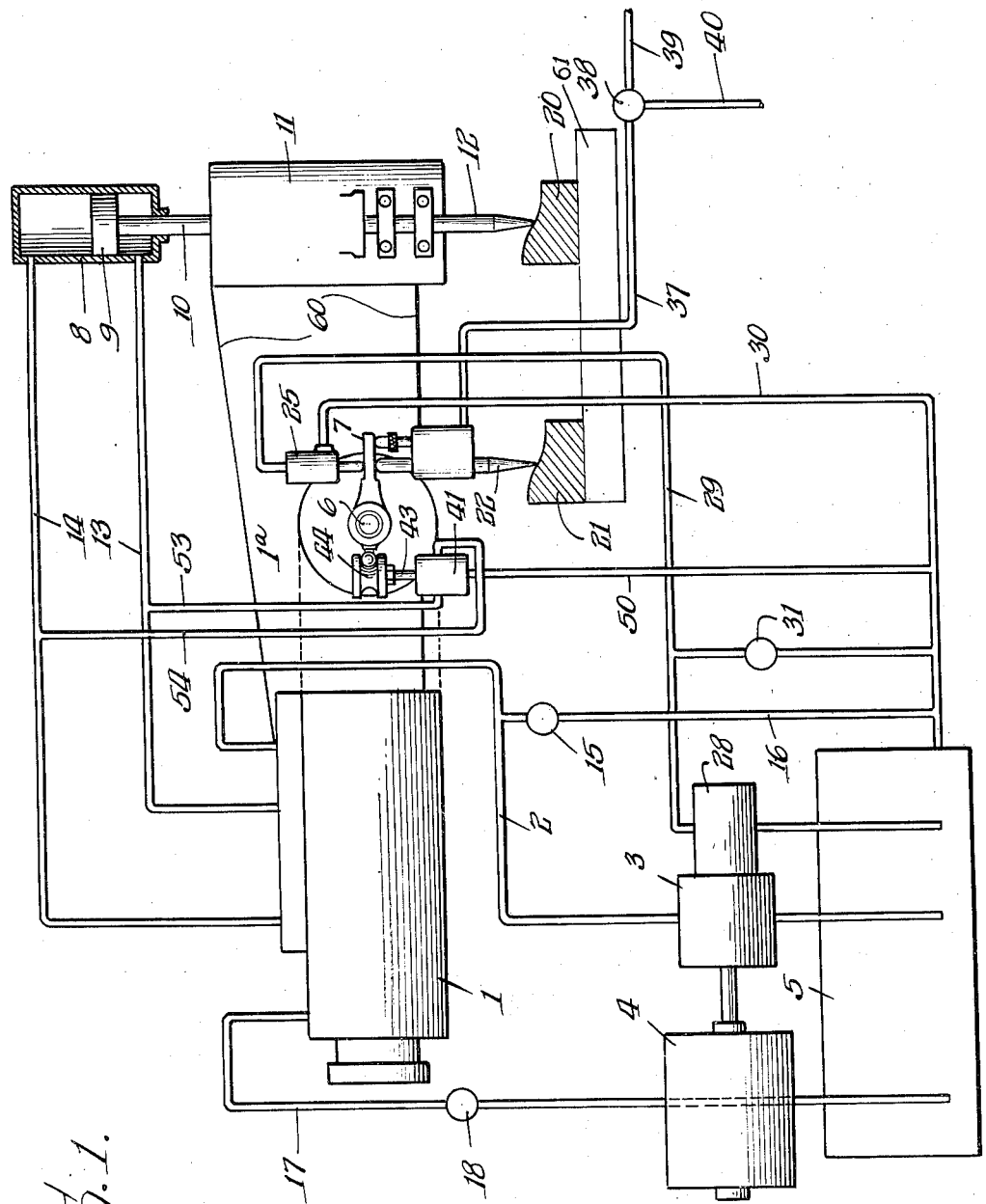

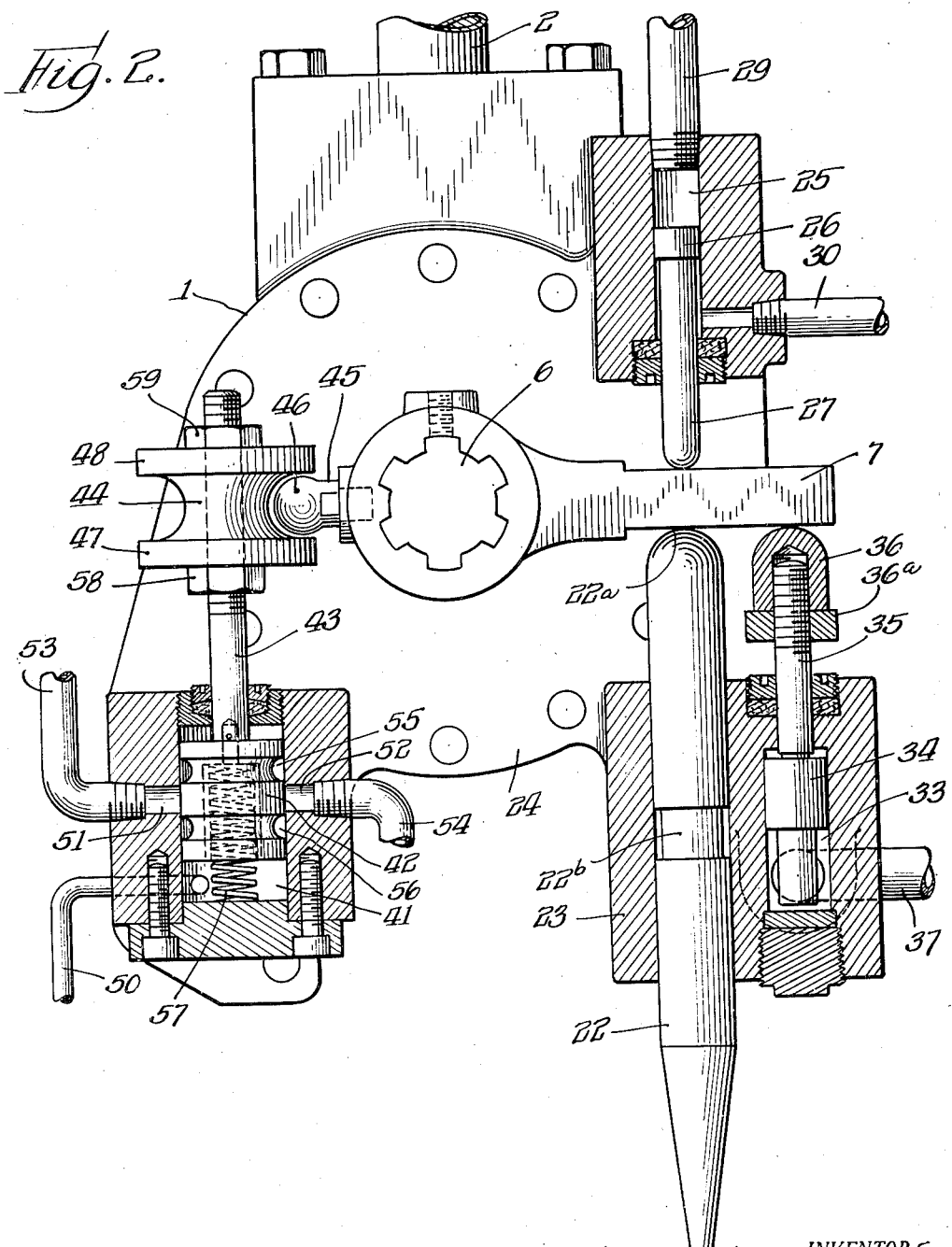

TRACER MECHANISM FOR MACHINE TOOLS

Elmer E. Hallberg and Joseph C. Verstynen, Rockford, Ill., assignors to Rockford Machine Tool Company, Rockford, Ill., a corporation of Illinois Application November 3, 1944, Serial No. 561,762

14 Claims. (Cl. 90—24.3)

This invention relates to machine tools equipped with pattern controlled mechanism governing the movement of the cutting tool.

It is a general object of the invention to provide a new and improved tracer mechanism for a pattern controlled machine tool.

Another object of the invention is to provide a new and improved hydraulic circuit and tracer mechanism included therein for actuating the adjustment of a cutting tool in a direction transverse to the relative movement between the tool and the work.

More particularly it is an object of the invention to provide a tracer controlled mechanism for adjusting a cutting tool including means responsive to movements of the tracer for avoiding unduly rapid changes of position in the cutting tool so as to prevent chattering thereof.

More specifically, the invention includes improvements in hydraulically actuated tracer controlled mechanism whereby the hydraulic pressure applied for moving the cutting tool toward the work is automatically modified in accordance with the rate of change of position of the tracer.

Other objects and advantages will appear from the following description taken in connection with the drawings, in which Fig. 1 is a diagrammatic view showing the essential parts of a machine tool embodying the invention, and including a cutting tool, a tracer mechanism, and a hydraulic circuit through which the tracer actuates the tool.

Fig. 2 is an elevational view showing a valve actuating lever with a tracer mechanism controlling it and with a stabilizing device embodying this invention applied thereto.

While the invention is susceptible of various modifications and alternative constructions, it is shown in the drawings and herein described in a preferred embodiment. However, it is not intended that the invention be limited to the specific disclosures made, but rather it is the intention to cover all modifications and alternative structures falling within the spirit and scope of the invention as defined in the appended claims.

The specific structure shown in the drawings may be understood as including a valve quite similar to that disclosed in Patent No. 2,311,987, issued to Paul S. Jackson, February 23, 1943. This valve includes a fixed sleeve and a cylinder rotatably adjustable in the sleeve for registering ports in the cylinder with ports in the sleeve to control the flow of pressure fluid for actuating the cutting tool of a machine.

The valve is employed in connection with a cylinder and piston device arranged to shift the cutting tool toward or from the work, and the valve acts as a reversing valve in that it is arranged to direct pressure fluid into one end of the cylinder or into the opposite end thereof, depending upon whether the valve itself is shifted in one direction or the other from a normal neutral position by a corresponding movement of a pattern-controlled tracer. Since the valve and its operating tracer are mounted on the same support as the tool, while the tracer is actuated by a pattern carried on the same support as the work piece, the range of movement of the valve and tracer in either direction from their neutral position is usually rather limited because each movement of the tracer and valve results almost instantly in a corresponding adjustment of the tool support, carrying the valve bodily with it and restoring the normal neutral position of the valve and tracer. However, if the pattern includes a part which is quite steeply inclined to the direction of feed, the valve will be shifted more rapidly than usual, attaining an opening which tends to apply excessive pressure to the tool before the resulting adjustment of the tool support begins to modify the position of the valve. The present invention includes means for temporarily reducing the effective pressure available for shifting the tool whenever movement of the tracer and consequent opening of the tracer-operated valve exceeds a predetermined range from the neutral position of these parts.

Fig. 1 represents the valve diagrammatically at 1 with a pressure line 2 leading from a pump 3 actuated by a motor 4 for maintaining a constant supply of oil or other pressure fluid drawn from a tank 5. Fig. 1 includes at 1ª a projected end view of the valve cylinder 1 with its actuating rock shaft 6 and lever arm 7. Movement of the arm 7 up or down shifts the cylindrical valve at 1 to admit the pressure fluid to a cylinder 8 having a piston 9 connected by a piston rod 10 to the tool carriage 11 for raising or lowering the cutting tool 12 carried thereby. If the valve admits fluid to the conduit 13 leading to the lower end of the cylinder 8 the tool 12 will be raised and if the valve 1 is shifted to admit the pressure through the line 14 to the upper end of the cylinder 8 the tool 12 will be lowered.

The effective pressure supplied through the conduit 2 is regulated by a pressure relief valve 15 connected through a drain conduit 16 to the tank 5; and liquid expelled from either end of the cylinder 8 by movement of the piston is returned through the valve 1 to the tank 5 by way of a return conduit 17 which includes the back pressure valve 18 operating in a well understood manner.

For purposes of illustration, this invention is shown herein as applied to a machine of the planer type in which a work piece 20 and a pattern 21 are mounted in fixed relation to each other so as to have similar movements relative to the cutting tool 12 and tracer finger 22, respectively. The cutting tool 12 and the tracer mechanism are both mounted on the tool carriage which is customarily fixed in a machine of this type, while the bed or table 61 supporting the work piece 20 and pattern 21 travels horizontally in alternate cutting and return strokes. The invention is equally applicable, however, to a machine in which these relations are reversed so that the work piece and pattern are stationary, while the tool carriage 11 is arranged to travel over them.

As shown in Fig. 2 the tracer point or finger 22 is slidably mounted for vertical movement in a guide frame 23 which is attached to the end wall or head 24 of the casing enclosing the valve 1. The lower end of the finger 22 normally rests upon the upper surface of the pattern 21, as shown in Fig. 1, while the rounded upper end 22ª of the finger engages the lever arm 7 on the end of the valve shaft 6. A small cylinder 25 is disposed above the lever arm 7 and contains a piston 26 having a piston rod 27 which bears against the upper side of the lever 7 for holding the lever constantly in engagement with the upper end of the tracer finger 22 and holding the tracer finger in contact with the pattern 21. A relatively light pressure normally about nine-pounds per square inch is maintained by an auxiliary pump 28 which is supplied through a conduit 29 to the upper end of the cylinder 25. Any leakage of pressure fluid past the piston 26 returns to the tank by way of a drainpipe 30, and the pressure supplied through the conduit 29 is controlled by a regulating valve 31 connected as shown in Fig. 1. The valve 31 thus provides a yielding means for holding the tracer finger to the pattern, since whenever the tracer finger is moved upward it must overcome the nine-pound pressure in the line 29, backing up the fluid therein past the regulating valve 31.

The guide 23 includes a cylinder 3 containing a piston 34 which has a piston rod 35 equipped with an adjustable head 36 for engaging the valve actuating arm 7 as shown in Fig. 2. Pressure fluid supplied through the pipe 37 may be admitted at will to shift to the cylinder 33 the valve 7 in a direction for lifting the tool 12 from the work independently of the tracer finger 22. This may be accomplished by the operator by actuation of a manual control valve 38 whenever it is desired to raise the tool from the work or it may be effected automatically at the end of the working stroke to permit rapid return of the table and for that purpose any suitable trip operated valve, not shown, may be employed. It is, therefore, convenient to provide the supply of pressure fluid through the pipe 37 from the same source as that which supplies pressure for driving the table in its reciprocating movement, and Fig. 1 indicates a supply pipe 39 and return conduit 40 which may be understood as connected to such a source.

The tracer valve mechanism shown herein differs somewhat from that of Patent No. 2,311,987, above mentioned, in that the actuating arm 7 is secured directly and rigidly to the rock shaft 6 of the valve cylinder, and the tracer finger 22 engages the arm 7 directly instead of acting through a jointed linkage, as in the patented structure. This insures a sensitive response of the valve to movement of the finger 22 and requires only the relatively light pressure supplied by the piston 26 to maintain contact of the tracer finger with the pattern. In some cases, however, if the contour of the pattern rises or falls rather abruptly, the resulting rapid opening of the ports of the valve 1 may apply excessive pressure to the piston 9 and to the tool 12 causing the tool to chatter and to produce a relatively rough cut. To avoid this result, there is provided a stabilizing mechanism which includes a cylinder or valve casing 41 secured to the head or end wall of the valve 1 and containing a spool-type valve member 42 with a valve stem 43 extending therefrom, and provided with an adjustably fitted flanged head 44. A short arm 45 having a rounded end 46 extends rigidly from the hub of the valve actuating lever 7 with its said rounded end portion 46 engaged between the flanges 47 and 48 of the head 44 on the valve stem 43. With the lever arm 7 at its normal neutral position the middle portion or spool of the valve 42 closes the ports 51 and 52 which are connected by pipes 53 and 54 with the conduits 13 and 14, respectively. The ports 51 and 52 are in circumferential alignment so that shifting of the valve member 42 in the cylinder 41 will provide a connection between these ports by way of the annular groove 55 or the annular groove 56, depending upon which way the valve 42 is shifted from its normal position. The connection between the ports 51 and 52 operates as a shunt across the lines 13 and 14 thus providing for a partial return flow of the pressure liquid from one of these lines to the other and diminishing the effective pressure operating against the piston 9 for moving the tool 12.

To permit normal operation of the valve 1 within a limited range of movement of the tracer finger 22, either above or below its neutral position, the spool of the valve 42 which closes the ports 51 and 52 is made slightly wider than said port so as to lap them in both directions of its movement. This lap must be about .005 of an inch in each direction. The corresponding normal range of the tracer finger 22 and the lever 7 may be further increased by fitting the rounded end 46 of the arm 45 with clearance between the flanges 47 and 48; preferably, such clearance is about .005 of an inch at each side of the part 46. Thus, the arm 7 must be swung far enough to shift the part 46 about .010 of an inch before the stabilizer valve 42 will begin to open the ports 51 and 52 so as to lower the effective pressure operating upon the tool 12, and since the arm 45 is considerably shorter than the effective length of the arm 7 with which the tracer finger 22 is engaged, the tracer will have a range of something more than .010 of an inch in either direction from its normal neutral position. The stabilizer valve 42 is normally supported upon a light spring 57 which holds the spool portion of the valve centered with respect to the ports 51 and 52, that is, lapping beyond said ports above and below them by equal amounts. The head 44 is adjustably secured on the valve stem 43 between nuts 58 and 59 so that with the valve at this normal position the flanges 47 and 48 may be spaced with equal clearance from the part 46 when the lever arm 7 holds the valve 1 in its normal neutral position. Any leakage of pressure fluid past the valve 42 is drained from the valve chamber 41 through a pipe 50 leading to the tank 5.

Since, as indicated by the outlines 60 in Fig. 1, the tracer valve 1 is carried on the same support as the tool 12 and moves bodily up or down when the tool is shifted by hydraulic pressure in the cylinder 8, the tracer finger 22 will not usually move far from its normal neutral position in following a pattern because a slight movement of the tracer from this neutral position actuates the piston 9 to shift the support 60 and the tool 12 in the same direction by a corresponding amount. This movement of the support 60 of course carries with it the casing of the tracer valve 1 and this bodily movement of the tracer valve relative to the tracer finger 22 which is held against the pattern produces a reverse swing of the lever arm 7 which readjusts the valve to its normal neutral position. The tracer control of the tool 12 is thus sufficiently sensitive to cause the tool to respond accurately and smoothly to gradual inclinations of the pattern without resulting in any movement of the tracer beyond its normal range within which the stabilizer valve 42 is affected; but, whenever the pattern involves an unusually steep portion requiring the tracer to move rapidly in either direction in following this portion of the pattern the resulting excessive movement of the lever 7 will take up the clearance between the part 46 and one of the flanges of the head 44 and will then shift the spool portion of the valve 42 far enough to provide communication between the parts 51 and 52 and between the lines 13 and 14 as already described. This lowering of the effective pressure operative upon the piston 9 will prevent the tool 12 from being too forcibly fed into the work piece and will permit it to continue cutting smoothly instead of chattering under excessive pressure.

To insure smooth operation of the tracer finger 22 in the guide 23 the finger is formed with a reduced portion 22$^b$ adapted to contain and distribute lubricant along the guide surface as the finger moves therein. To insure accurate positioning of the head 36 on the stem 35 of the auxiliary tool lift device, the head 36 is threaded onto the end of the stem 35 and secured at adjusted position by means of a lock nut 36$^a$ on said stem.

In the tracer valve shown in Patent No. 2,311,987, above mentioned, the ports of one member of the valve are so arranged as to be completely out of registration with the ports of the other member when the valve is in neutral position, so that communication is cut off between the supply of pressure fluid and both conduits leading to the cylinder and piston device which shifts the tool. It may be understood, however, that the ports of the valve may be so designed that in neutral position the ports leading from the pressure fluid supply will slightly overlap the ports connecting with both conduits leading respectively to the opposite ends of the cylinder. This will tend to afford a still more sensitive response to movement of the tracer, the piston of the tool adjusting device being confined between the two opposing columns of pressure fluid and moving instantly in response to any differential of pressure as between the two. The stabilizing device herein shown and described will be equally effective and advantageous whether the tracer valve is constructed exactly in accordance with said Patent No. 2,311,987 or with overlapping ports as just explained.

We claim as our invention:

1. In a machine tool having a pair of relatively movable slides with a tool and tracer carried by one slide and a work-piece and pattern carried by the other slide, a cylinder and piston device operable to move the tool slide toward and from the work, a valve with conduits leading therefrom to opposite ends of the cylinder, respectively, said valve being movable in response to the tracer in either direction from a neutral position for directing pressure fluid selectively to one end of the cylinder or to its opposite end, by-pass means operable automatically to reduce the effective pressure applied to the cylinder, and means connected to the tracer-operated valve effective to actuate said by-pass means when the movement of the tracer-operated valve exceeds a predetermined range from its neutral position.

2. In a machine tool having a pair of relatively movable slides with a tool and a tracer carried by one slide and a work piece and a pattern carried by the other slide, a cylinder and piston device operable to move the tool slide toward and from the work, a valve operable by the tracer, conduits connecting said valve to opposite ends of the cylinder, respectively, said valve being movable in either direction from a neutral position for directing pressure fluid selectively to one end of the cylinder or to its opposite end, means forming a passage connecting said conduits together at points intermediate the tracer valve and said cylinder, a normally closed stabilizer valve interposed in said passage, and means shifting said stabilizer valve to open position when the movement of the tracer-operated valve exceeds a predetermined range from its neutral position.

3. In a machine tool having a pair of relatively movable slides with a tool and a tracer carried by one slide and a work piece and a pattern carried by the other slide, a cylinder and piston device operable to move the tool slide toward and from the work, a valve operable by the tracer, conduits connecting said valve to opposite ends of the cylinder, respectively, and through which pressure fluid is admitted to the cylinder under control of said valve, a normally closed stabilizer valve interposed in a passage connecting said conduits intermediate the tracer valve and said cylinder, and a lost motion connection between said tracer and the stabilizer valve operable to shift the latter to open position when the movement of the tracer exceeds a predetermined amount.

4. In a machine tool having a pair of relatively movable slides with a tool and a tracer carried by one slide and a work piece and a pattern carried by the other slide, a cylinder and piston device operable to move the tool slide toward and from the work, a valve operable by the tracer, conduits connecting said valve to opposite ends of the cylinder, respectively, and through either of which pressure fluid may be admitted to one end of the cylinder while pressure fluid is released from the other end of the cylinder through the other conduit under control of said valve, and means automatically providing a restricted connection between said conduits independently of said valve when the movement of the tracer exceeds a predetermined amount from its neutral position.

5. In a machine tool having a pair of relatively movable slides with a tool and a tracer carried by one slide and a work piece and a pattern carried by the other slide, a cylinder and piston device operable to move the tool slide toward and from the work, a reversing valve operable by the tracer in either direction from a neutral position, conduits connecting said valve to opposite ends of the cylinder, respectively, and through either of which pressure fluid may be admitted to the corresponding end of the cylinder while pressure fluid is released from the other end of the cylinder through the other conduit under control of said valve, a normally closed stabilizer valve interposed in a passage connecting said conduits at points intermediate the tracer valve and said cylinder, and means shifting said stabilizer valve to open position when the movement of the tracer-operated valve exceeds a predetermined range from its neutral position.

6. In a machine tool having a pair of relatively movable slides with a tool and a tracer carried by one slide and a work piece and a pattern carried by the other slide, a cylinder and piston device operable to move the tool slide toward and from the work, a tracer valve operable in response to the tracer in either direction from a neutral position, conduits connecting said valve to opposite ends of the cylinder, respectively, and through either of which pressure fluid may be admitted to one end of the cylinder while pressure fluid is released from the other end of the cylinder through the other conduit under control of said valve, a normally closed stabilizer valve interposed in a passage connecting said conduits intermediate the tracer valve and said cylinder, and means shifting said stabilizer valve to open position when the movement of the tracer valve exceeds a predetermined range from its neutral position, said stabilizer valve controlling ports into which said passage is connected and being formed to lap said ports in both directions from its normal closed position whereby said valve must be shifted a limited distance before it opens the passage between said conduits.

7. In a machine tool having one support with a cutting tool and a tracer carried thereby, another support with a work piece and a pattern carried thereon, said supports being relatively movable to cause the tool to traverse the work in the cutting operation and to cause the tracer to traverse the pattern, and a fluid pressure controlled mechanism for shifting the tool transversely of the direction of said traverse in response to similar transverse movements of the tracer in traversing the pattern including a valve operable by the tracer and controlling the admission of pressure fluid to said mechanism, by-pass means operable automatically to reduce the effective pressure applied to said mechanism, and means connected to the tracer-operated valve effective to actuate said by-pass means when the pattern-controlled movement of the tracer exceeds a predetermined amount.

8. In a machine tool having one support with a cutting tool and a tracer carried thereby, another support with a work piece and a pattern carried thereon, said supports being relatively movable to cause the tool to traverse the work in the cutting operation and to cause the tracer to traverse the pattern, and a fluid pressure controlled mechanism for shifting the tool transversely of the direction of said traverse in response to similar transverse movements of the tracer in traversing the pattern including a valve operable by the tracer and controlling the admission of pressure fluid to said mechanism, fluid supply and return conduits for said mechanism, means forming a passage connecting said conduits, a normally closed stabilizer valve interposed in said passage connecting said conduits, and means shifting said stabilizer valve to open position when the pattern-controlled movement of the tracer exceeds a predetermined amount.

9. In the combination defined in claim 8, said stabilizer valve being of the spool type connected to the tracer and movable in a cylindrical casing having circumferentially aligned ports leading into said passage, and the spool of the valve having a limited lap with respect to said ports in both directions of valve movement, whereby effective opening of the passage is delayed until the tracer movement exceeds said predetermined amount.

10. In a machine tool having one support with a cutting tool and a tracer carried thereby, another support with a work piece and a pattern carried thereon, said supports being relatively movable to cause the tool to traverse the work in the cutting operation and to cause the tracer to traverse the pattern, and a fluid pressure controlled mechanism for shifting the tool transversely of the direction of said traverse in response to similar transverse movements of the tracer in traversing the pattern including a valve with a rocker arm operable by the tracer, said valve controlling the admission of pressure fluid to said mechanism, and fluid supply and return conduits for said mechanism, a normally closed stabilizer valve interposed in a passage connecting said conduits, and a lost-motion connection between said rocker arm and the stabilizer valve operable to shift the latter to open position when the movement of the rocker arm exceeds a predetermined amount.

11. In a machine tool having one support with a cutting tool and a tracer carried thereby, another support with a work piece and a pattern carried thereon, said supports being relatively movable to cause the tool to traverse the work in the cutting operation and to cause the tracer to traverse the pattern, and a fluid pressure controlled mechanism for shifting the tool transversely of the direction of said traverse in response to similar transverse movements of the tracer in traversing the pattern including a tracer valve controlling the admission of pressure fluid to said mechanism, means providing a one-way drive between the tracer and said valve by which the valve is movable in one direction by the tracer, a fluid pressure actuated member having a one-way operating engagement with said tracer valve arranged to move it in the opposite direction and to maintain contact of the tracer with the pattern, means supplying fluid thereto at a relatively low pressure as compared with the pressure employed to shift the tool, said last mentioned means including a supply conduit with a pressure relief valve connected thereto adapted to yield to permit actuation of the tracer valve by its one-way drive from the tracer.

12. In a machine tool having one support with a cutting tool and a tracer carried thereby, another support with a work piece and a pattern carried thereon, said supports being relatively movable to cause the tool to traverse the work in the cutting operation and to cause the tracer to traverse the pattern, and a fluid pressure controlled mechanism for shifting the tool transversely of the direction of said traverse in response to similar transverse movements of the tracer in traversing the pattern including a valve with a rocker arm operable by the tracer, said valve controlling the admission of pressure fluid to said mechanism, and a fluid pressure operable member engageable with said rocker arm and operable to shift the arm independently of the tracer in a direction for causing the tool to be withdrawn from the work, together with a control valve for supplying pressure fluid for actuation of said member.

13. In a machine tool having one support with a cutting tool and a tracer carried thereby, another support with a work piece and a pattern carried thereon, said supports being relatively movable to cause the tool to traverse the work in the cutting operation and to cause the tracer to traverse the pattern, and a fluid pressure controlled mechanism for shifting the tool transversely of the direction of said traverse in response to similar transverse movements of the tracer in traversing the pattern including a valve with a rocker arm, said tracer having a one way driving engagement with said rocker arm by which the said valve is movable in one direction, a fluid pressure operated plunger having a one way driving engagement with said rocker arm arranged to urge said arm in the opposite direction for maintaining contact of the tracer with the pattern, a fluid supply line for said plunger and a relief valve connected to said line permitting the plunger to yield in response to pattern controlled movements of the tracer and rocker arm, a fluid pressure operable device having driving engagement with said rocker arm adapted to move it in opposition to said plunger and to shift the valve into position for applying pressure fluid to said mechanism to actuate the latter in a direction for withdrawing the tool from the work, and a control valve operable independently of the tracer to apply fluid pressure to said device.

14. In a machine tool having one support with a cutting tool and a tracer carried thereby, another support with a work piece and a pattern carried thereon, said supports being relatively movable to cause the tool to traverse the work in the cutting operation and to cause the tracer to traverse the pattern, and a fluid pressure controlled mechanism for shifting the tool transversely of the direction of said traverse in response to similar transverse movements of the tracer in traversing the pattern including a rotatably adjustable valve with a rocker arm attached thereto and operable by the tracer, said valve controlling the admission of pressure fluid to said mechanism, fluid supply and return conduits for said mechanism, a normally closed stabilizer valve interposed in a passage connecting said conduits, said valve having a reciprocable stem and a second arm attached to the rotatable valve and connected to said stem for shifting the stabilizer valve to open position when the movement of the rotatable valve exceeds a predetermined amount.

ELMER E. HALLBERG.
JOSEPH C. VERSTYNEN.

REFERENCES CITED

The following references are of record in the file of this patent:

UNITED STATES PATENTS

| Number | Name | Date |
|---|---|---|
| 2,003,557 | Sassen | June 4, 1935 |
| 2,025,748 | Howe | Dec. 31, 1935 |
| 2,030,022 | Kain | Feb. 4, 1936 |
| 2,079,720 | Shaw | May 11, 1937 |
| 2,190,988 | Johansen | Feb. 20, 1940 |
| 2,301,719 | Turchan | Nov. 10, 1942 |
| 2,349,171 | Jackson | May 16, 1944 |